United States Patent [19]
Brum

[11] Patent Number: 4,852,455
[45] Date of Patent: Aug. 1, 1989

[54] DECOY SYSTEM
[75] Inventor: Roger D. Brum, Irvine, Calif.
[73] Assignee: Southwest Aerospace Corporation, Santa Ana, Calif.
[21] Appl. No.: 140,478
[22] Filed: Jan. 4, 1988

Related U.S. Application Data

[63] Continuation-in-part of Ser. No. 3,248, Jan. 12, 1987, Pat. No. 4,718,320.

[51] Int. Cl.$^4$ .............. B64D 1/00; F41J 9/08
[52] U.S. Cl. .................. 89/1.14; 244/1 TD; 273/360; 273/361
[58] Field of Search .......... 89/1.816, 1.819, 1.818, 89/1.57, 1.14, 1.8, 1.809, 1.810, 1.806, 8; 273/361, 360; 244/1 TD

[56] References Cited

U.S. PATENT DOCUMENTS

| | | | |
|---|---|---|---|
| 2,381,130 | 8/1945 | Lloyd | 244/1 TD |
| 2,448,343 | 8/1948 | Zandmer | 89/1.816 |
| 2,551,596 | 5/1951 | Haglund | 273/360 |
| 2,813,719 | 11/1957 | Hopper | 273/361 |
| 2,907,536 | 10/1959 | Von Zborowski | 244/34 A |
| 2,923,549 | 2/1960 | Hopper et al. | 244/1 TD |
| 2,953,377 | 9/1960 | Brust | 273/361 |
| 2,998,754 | 9/1961 | Bialy | 89/1.816 |
| 3,002,708 | 10/1961 | Wetzel et al. | 273/361 |
| 3,135,511 | 6/1964 | Norman et al. | 273/360 |
| 3,225,655 | 12/1965 | Inglis | 89/1.86 |
| 3,505,926 | 4/1970 | Johnson | 89/1.34 |
| 3,610,096 | 10/1971 | Bauman et al. | 89/1.816 |
| 3,808,941 | 5/1974 | Biggs | 89/1.51 |
| 3,871,321 | 3/1975 | Giebel et al. | 89/1.14 |
| 4,062,112 | 12/1977 | Lake | 89/1.14 |
| 4,607,849 | 8/1986 | Smith et al. | 273/348.1 |

FOREIGN PATENT DOCUMENTS

| | | | |
|---|---|---|---|
| 1229397 | 11/1966 | Fed. Rep. of Germany | 244/1 TD |
| 1336769 | 7/1963 | France | 244/1 TD |

Primary Examiner—David H. Brown
Attorney, Agent, or Firm—Stetina and Brunda

[57] ABSTRACT

A decoy system is disclosed characterized by use of a rotating towline spool having an axial bore therethrough adapted to receive a pyrotechnic charge adjacent one end thereof and communicate gas pressure upon detonation of the charge to the decoy to deploy the decoy from an aircraft. Pyrotechnic charges for both decoy ejection and towline cutting may be externally loaded into the system without the need to disassemble the decoy system and the use of the axial bore through the spool results in desired space economies. The interior of the decoy cannister is provided with plural guide rails and contoured guide rollers which facilitate ejection of the decoy from the cannister in directions even or perpendicular to the airstream of the aircraft. Towline spool and decoy terminations and a method of fabricating the same are disclosed which yield sufficient strength to withstand peak tensile forces exerted during initial acceleration and subsequent maximum pay out of the decoy.

24 Claims, 3 Drawing Sheets

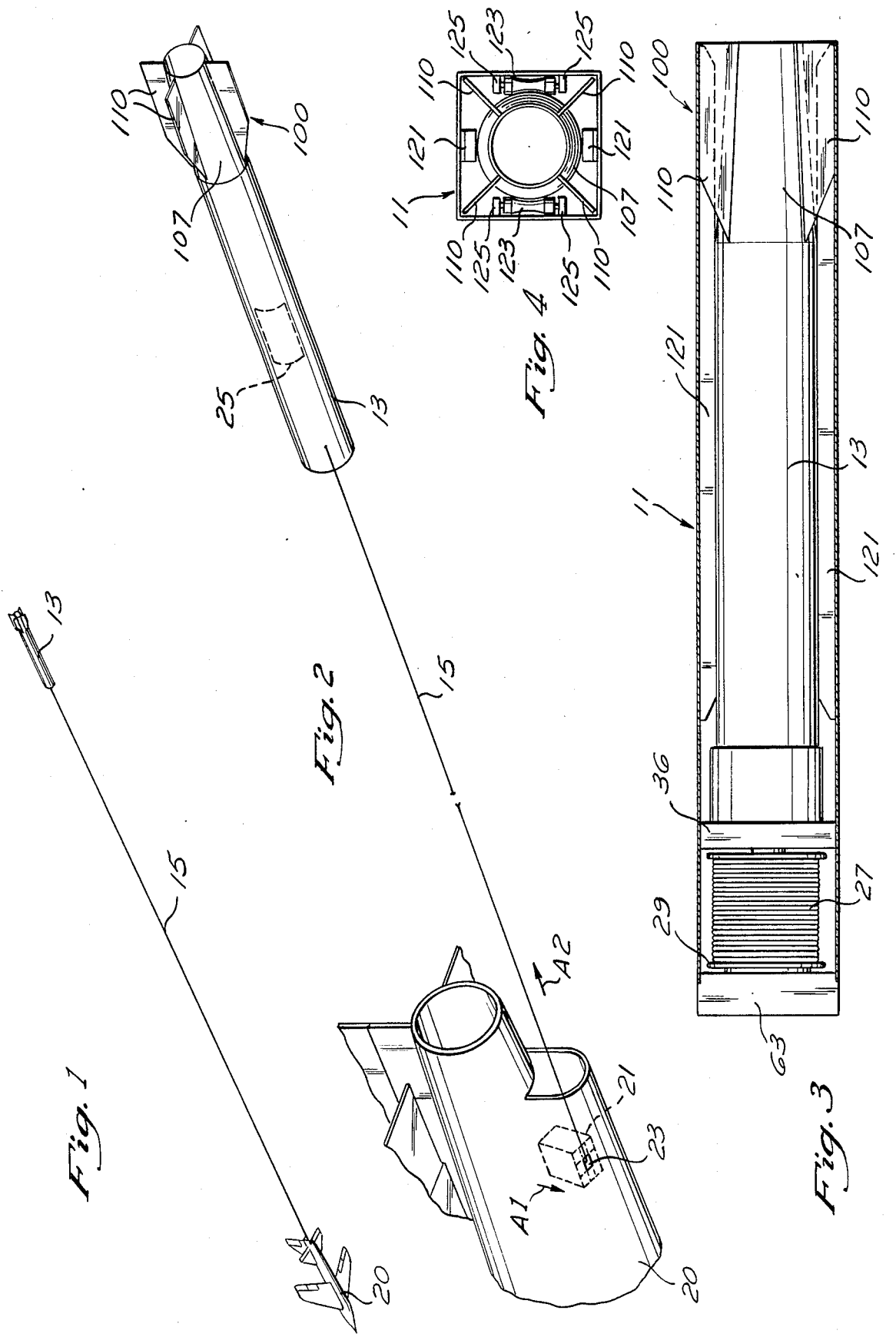

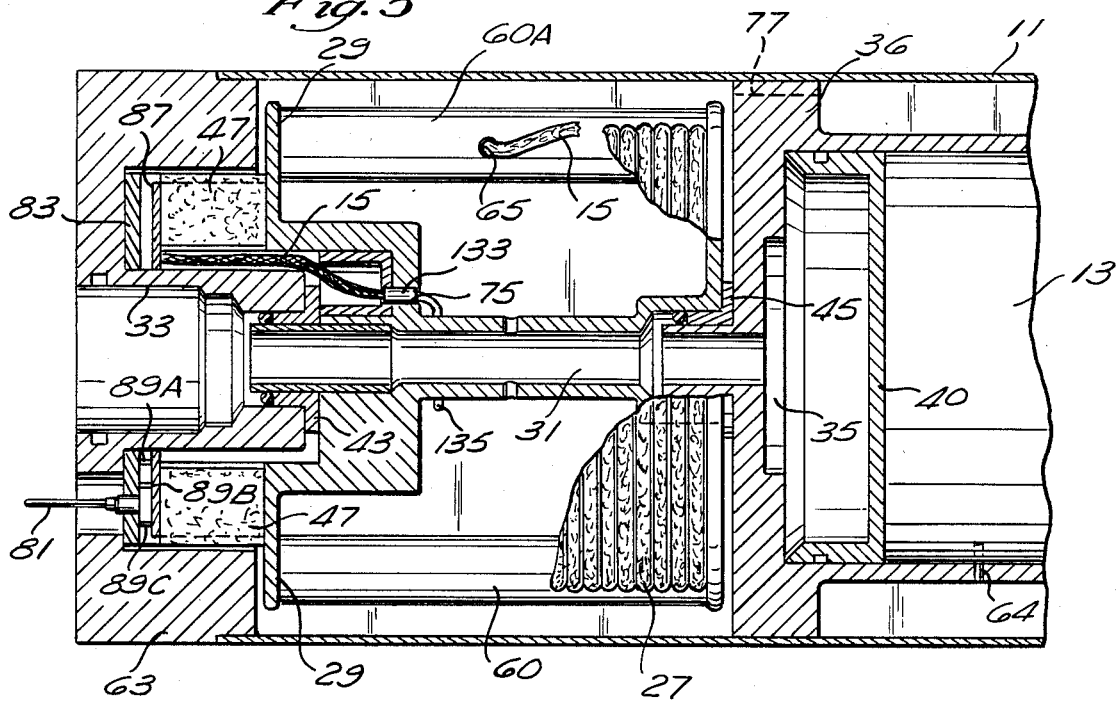
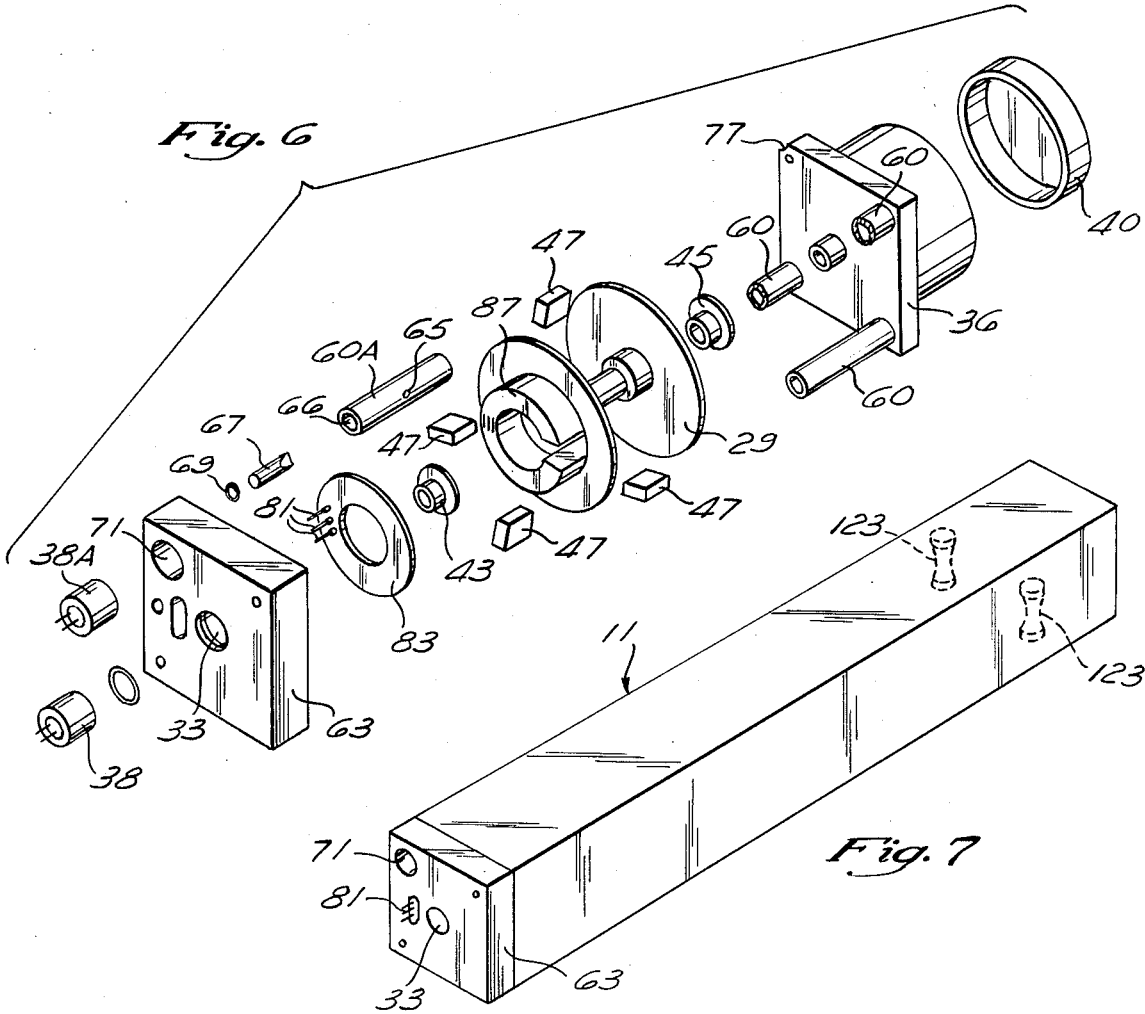

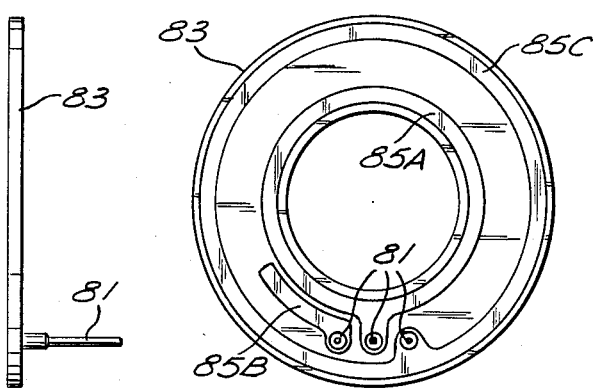
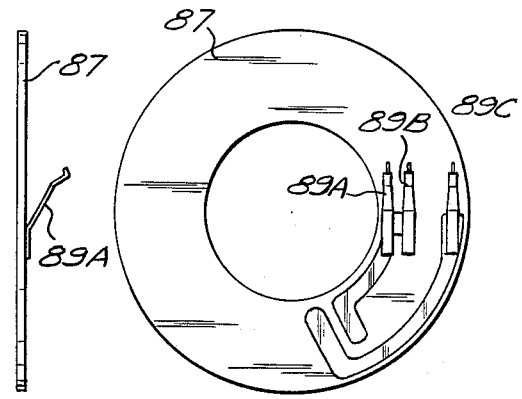
Fig. 8A  Fig. 8B  Fig. 9A  Fig. 9B
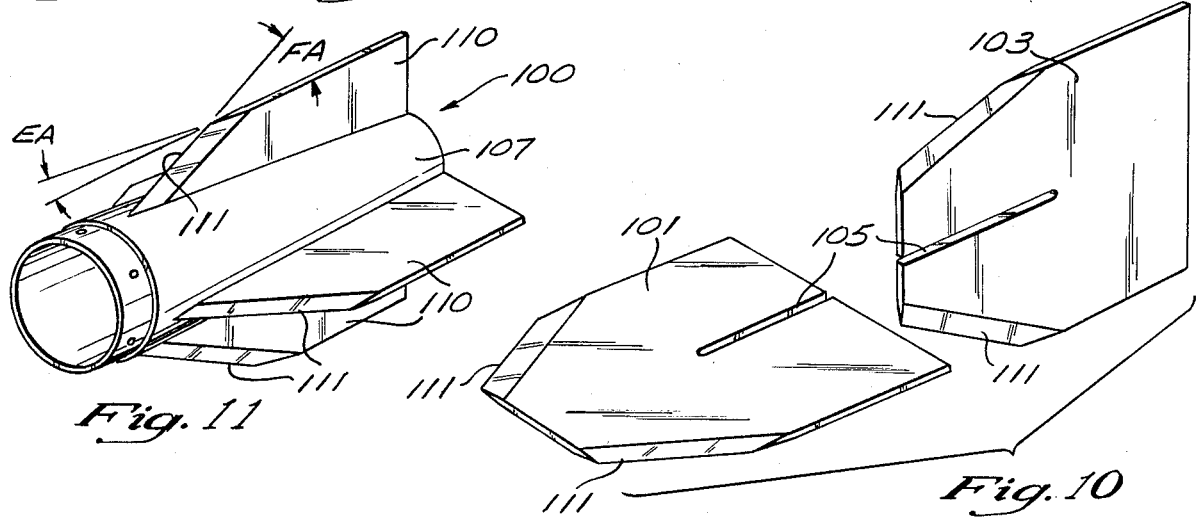
Fig. 11  Fig. 10
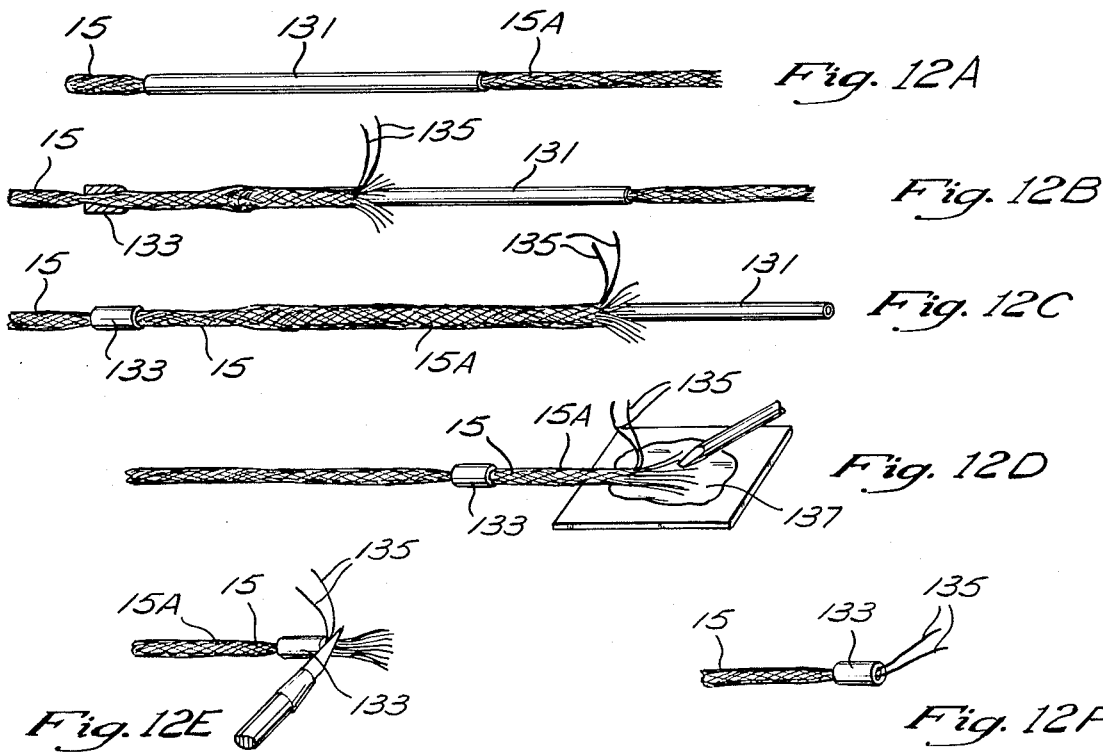
Fig. 12A
Fig. 12B
Fig. 12C
Fig. 12D
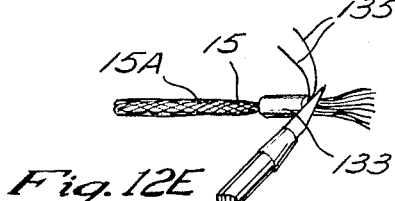
Fig. 12E
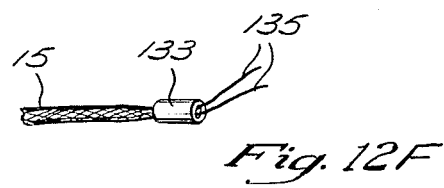
Fig. 12F

DECOY SYSTEM

RELATED APPLICATIONS

The present application is a continuation-in-part patent application of co-pending United States parent patent application Ser. No. 003,248, filed Jan. 12, 1987 in the name of the subject applicant, Roger D. Brum, entitled TOWED DECOY SYSTEM, which application is assigned to the assignee of the present application and which application will issue as United States Letters Pat. No. 4,718,320 on Jan. 12, 1988. The disclosure of said parent patent application is expressly incorporated herein by reference.

BACKGROUND OF THE INVENTION

The present invention relates to expendable decoys and, more particularly, to an advanced airborne expendable decoy system adapted to be towed behind military aircraft.

Aircraft decoys are used to draw various types of guided weapons away from an aircraft that the weapons are intended to destroy. Such systems contain various types of electronic circuits to create an apparent target to the weapon to attract the weapon to the decoy, rather than the aircraft.

Various types of thermal and electronic towed decoy devices have been used for many years as defensive systems for aircraft. Such devices include flares designed to attract infrared guided missiles and active electronic devices (e.g. transponders) adapted to receive radar signals and rebroadcast an amplified return signal. The flare or transponder is designed to present a larger thermal or electronic target than the aircraft from which it is deployed and thereby attract the weapon away from the aircraft. As the programming of anti-aircraft weaponry becomes more sophisticated to better discriminate between decoys and aircraft, the need to provide decoys with enhanced capabilities similarly evolves. Moreover, insofar as different anti-aircraft weapons utilize different types of electronic or thermal imaging systems, there exists a need to maintain an adequate inventory to defeat an attack by any of a variety of different types of anti-aircraft weapons that may be fired at the aircraft.

The principal limitations in the use of various types of thermal and electronic decoying devices are the space, weight, and economic limitations relative to the inclusion of any type of ordinance aboard an aircraft. Inclusion of a large number of expendable defensive systems may result in weight and drag penalties that may limit the performance envelope of the aircraft and thereby limit the pilot's ability to maneuver the aircraft away from a threat. Accordingly, it is highly desirable to devise towed decoys and towed decoy deployment systems that can cooperate with on-board defensive systems to defeat a variety of different types of anti-aircraft threats, with minimum space requirements and without imposing undue weight or drag penalties on the aircraft performance.

Aside from the aforementioned limitations relating to the aircraft performance, other limitations exist with respect to the maintenance of towed decoy deployment systems. One such limitation relates to the conventional use of pyrotechnic explosive charges to rapidly deploy, i.e. eject, the decoy from the aircraft as needed. Conventional towed decoy systems utilize decoys disposed in cannisters having explosive ejection charges contained within the body of the cannister between the towline spool or payout mechanism and the stored decoy. Because the explosive charges have a limited shelf life, cannisters which have exceeded that shelf life heretofor have been required to be disassembled to replace the explosive ejection charge. Due to system complexity, such disassembly is not normally permissible by aircraft maintenance technicians in the field and therefore must be performed at depot level maintenance facilities. Thus, the cannisters would typically be removed and shipped to remote maintenance facilities to affect periodic replacement of the ejection charge. Such procedures limit the readiness status of the equipment and contribute to unacceptable expenses which detract from efficient use of limited amounts of defense funds.

These above-referenced deficiencies have been addressed and alleviated by the invention disclosed in co-pending United States patent application Ser. No. 003,248, filed on Jan. 12, 1987, entitled TOWED DECOY SYSTEM now issued as U.S. Pat. No. 4,178,320, the disclosure of which is expressly incorporated herein by reference. Through the continued development of such towed decoy systems, further problematic deficiencies have been identified which detract from the overall effectiveness of towed decoy systems. Foremost has been the recognition that space limitations existing on military aircraft will require, in some instances, the deployment of the towed decoy system in an orientation or direction perpendicular to the airstream of the aircraft wherein friction arising from high aerodynamic side load upon the decoy entering the airstream may cause the decoy to be improperly deployed, or in severe instances become stalled within the decoy ejection cannister. As will be recognized, improper deployment in such instances will at least prohibit the proper operation of the decoy system and further may adversely affect the maneuverability of the aircraft.

In addition, deployment of towed decoys in an orientation perpendicular to the airstream of the aircraft typically imposes substantial increased strength requirements to the tow cable wherein conventional tow line payout and terminations are rendered ineffective causing the tow line to snap during deployment, rendering the towed decoy irretrievably lost.

Further, in view of pyrotechnic explosive charges additionally being utilized in such towed decoy systems for shearing or cutting the towline after deployment with such pyrotechnic explosive charges additionally having a finite shelf life, the prior art towed decoy systems utilizing differing pyrotechnic charges for ejection of the decoy from the aircraft and shearing of the towline serve to increase pyrotechnic charge inventories.

As such, there exists a substantial need in the art for an improved towed decoy system which is specifically adapted to permit rapid and fail-safe ejection and subsequent deployment of the decoy systems in both perpendicular and non-perpendicular orientations to the aircraft airstream, and further permits interchangeability of pyrotechnic charges between the ejection sub-assembly and towline cutter sub-assembly of the towed decoy system.

SUMMARY OF THE INVENTION

The present invention is specifically directed toward meeting the aforementioned recently identified deficiencies in towed decoy systems. More particularly, the invention is directed to a towed decoy and deployment system which enables mo-e economical use of available on-board storage space, thus limiting space penalties and permitting the inclusion of additional decoys within the available space envelope within the aircraft. In this regard, the present invention is specifically adapted to allow deployment of the decoy in orientations both perpendicular as well as non-perpendicular to the airstream of the aircraft. As such, the decoy system of the present invention may be effectively utilized on a multitude of aircraft and be positioned within available space envelopes which heretofor had been incapable of allowing use of conventional decoy systems.

In addition, the present invention specifically addresses the extremely high friction forces arising from aerodynamic side loading of the decoy during deployment from orientations perpendicular to the aircraft airstream. More particularly, the present invention incorporates a novel contoured bearing roller assembly which facilitates ejection of the decoy perpendicular to the airstream where friction arising from high aerodynamic side load could otherwise reduce or stall deployment of the decoy from its housing. Further, the present invention incorporates improved towline terminations at the decoy end and spool end of the towline which are sufficient to withstand the increased ejection and tension peak loads encountered in deployment of towed decoys in orientations perpendicular to the airstream.

In addition, the present invention additionally provides a decoy having four equally spaced swept fins with sharpened leading edges. The sharpened edges provide precise aerodynamic alignment to minimize roll torques that arise from fin alignment imperfections. Further, the four equally spaced swept fins are formed having relatively long cord and short span lengths that are optimally received within the square cross-section of the decoy dispenser housing. The precise design of the fins comprise fixed non-deployable surfaces that provide decoy stability at both sub-sonic and super-sonic speeds.

The invention is also directed to an expendable decoy deployment or ejection system wherein the ejection pyrotechnic charge and towline cutter pyrotechnic charge are interchangeable and may be externally loaded, without the need to disassemble the cannister housing containing the expendable decoy and the towline payout system. Accordingly, the present invention permits enhancement of the defensive capabilities of an aircraft while limiting the time needed to periodically maintain those defensive systems.

BRIEF DESCRIPTION OF THE DRAWINGS

These as well as other features of the present invention will become more apparent upon reference to the drawings wherein:

FIG. 1 illustrates a decoy being towed by an aircraft;

FIG. 2 is an enlarged view of a portion of FIG. 1 illustrating the housing supporting the deployment or ejection system and the towed decoy attached thereto;

FIG. 3 is a cross-sectional view of the cannister containing the decoy and deployment system formed in accordance with the present invention;

FIG. 4 is an end view of the cannister containing the decoy and deployment system formed in accordance with the present invention;

FIG. 5 is an enlarged fragmentary view of a portion of FIG. 3 illustrating the towline spool and payout system;

FIG. 6 is an exploded view of the towline spool and payout head assembly of the present invention;

FIG. 7 is a perspective view of the cannister containing the decoy and deployment system of the present invention;

FIG. 8A is an end view of the stationary slip ring board utilized in the present invention to provide an electrical interface connector;

FIG. 8B is a plan view of the stationary slip ring of FIG. 8A illustrating the printed wiring formed thereon;

FIG. 9A is an end view of the dynamic slip ring of the present invention which, in conjunction with the stationary slip ring illustrated in FIGS. 8A and 8B, forms an electrical interface connector for the decoy and deployment system of the present invention;

FIG. 9B is a plan view of the dynamic slip ring of FIG. 9A;

FIG. 10 is an exploded perspective view of the assembly utilized to form the swept fins of the decoy of the present invention;

FIG. 11 is a partial perspective view of the swept fins mounted upon the tail cone assembly of the decoy of the present invention; and FIGS. 12A through 12F are schematic views illustrating the manner in which the towline terminations are formed to provide increased tensile strength to the towline cable of the present invention.

DETAILED DESCRIPTION OF THE PRESENTLY PREFERRED EMBODIMENT

The detailed description set forth below in connection with the appended drawings is intended merely as a description of the presently preferred embodiment of the invention, and is not intended to represent the only form in which the present invention may be constructed or utilized. The description sets forth the functions and manipulative steps for making and utilizing the invention in connection with the illustrated embodiment. It is to be understood, however, that the same or equivalent functions and/or manipulative steps may be accomplished by different embodiments that are also intended to be encompassed within the spirit and scope of the present invention.

FIG. 1 illustrates a towed decoy 13 being towed by an aircraft 20, connected to the decoy by a towline 15. As is conventional, the decoy 13 may house a plurality of differing types of decoy devices, such as infrared flares and/or electronic transponders intended to draw any aircraft weaponry away from aircraft 20.

FIG. 2 is an enlarged view of a portion of FIG. 1 showing the tail assembly of an aircraft 20 in more detail along with the structure of the towed decoy 13. Aircraft 20 is shown to support a rocket launcher store or housing 21 having an aperture 23 formed therein extending to the exterior surface of the aircraft 20. In practice, the housing 21 may be formed by a multiplicity of decoy cannisters such as the cannister 11, shown at FIG. 3 which are clustered together in an array and disposed adjacent the aperture 23. The housing 21 may be situated at various angles and locations on the aircraft. For purposes of illustration and not limitation, the housing 21 is situated in an axial orientation which is perpendicular to the airstream of the aircraft 20 whereby during deployment of the decoy 13, the decoy is initially ejected from the housing 21 through aperture 23 in a direction perpendicular to the airstream (as indicated by the arrow A1 in FIG. 2) and subsequently payed out and towed in the direction of the airstream by towline 15 (as indicated by the arrow A2 in FIG. 2). As will be recognized, initial ejection of the decoy 13 in a direction perpendicular from the airstream causes the decoy 13 to encounter substantial aerodynamic side load which generates high frictional forces upon the decoy and its respective cannister 11.

Each of the cannisters 11 include a decoy 13, a decoy ejection mechanism for discharging the decoy from the aircraft 20, and a towline payout system. In the presently preferred embodiment the cannister 11 is formed to have a square cross-section of approximately 2.75 inches and an axial length of approximately 19.0 inches so as to be utilized in conventional rocket launcher stores 21. Depending upon the aircraft space available, approximately six or more cannisters may be carried within the housing or store assembly 21 for deployment as necessary.

The towline 15 connecting to the decoy 13 is adapted to communicate electrical signals to the decoy to regulate the operation of the defensive systems housed in the decoy. The towline 15 also serves the mechanical towing function of insuring that the decoy 13 remains connected to the aircraft 20.

Conventional electronic circuitry 25 is disposed within the decoy 13. Electronic circuitry 25 is typically adapted to receive interrogating signals from the anti-aircraft weapon system and control signals from control circuitry in aircraft 20 and to generate responsive signals intended to interfere with the operation of anti-aircraft weaponry. In practice, circuitry 25 may comprise a transponder adapted to receive and amplify interrogating radar signals such that the decoy generates a stronger radar signature than aircraft 20, thereby attracting anti-aircraft weaponry to the decoy rather than to aircraft 20. Circuitry 25 may be arranged to operate in a variety of different frequency ranges to defeat different types of anti-aircraft guidance systems. It is to be understood, however, that the invention is not intended to be limited to use in conjunction with a particular type of circuitry carried in the decoy and clearly contemplates alternative anti-aircraft decoy systems such as infrared flares and other analogous systems.

FIGS. 3-8 illustrate the detailed construction of an exemplary cannister 11 including decoy 13, a decoy ejection mechanism, and towline payout system, illustrated in more detail at FIGS. 5 and 6. Towline 15 is connected to the decoy 13 and is stored for deployment in windings 27 formed about the central axis of a rotatable spool 29. The spool 29 has an axial bore 31 formed therethrough, extending from a charge cavity 33, formed in end cap 63, to a load spreading cavity 35 formed in front of the forward surface of an end plate 36. As explained in more detail below, the detonation of a pyrotechnic charge 38 placed in charge cavity 33 will cause gas pressure to pass through, i.e, be communicated through the axial bore 31, resulting in the discharge of decoy 13 from cannister 11.

FIGS. 5 and 6 provides more detail of the decoy deployment or ejection mechanism formed within the cannister 11. The mechanism is designed to receive a conventional pyrotechnic charge 38, such as an MK131- MODO charge within charge cavity 33. When the charge 38 within charge cavity 33 is detonated, the resulting gases are directed through axial bore 31 of reel 29 where they pass to load spreading cavity 35 which applies pressure to a piston, i.e, sabot 40 disposed in an abutting relationship with the front portion of decoy 13. The resulting force shears shear pin 64 and rapidly urges, i.e., ejects, the decoy 13 axially outward away from charge cavity 33 and, upon travel along the axial length of the cannister 11, the decoy is thereby ejected. As the decoy 13 is urged out of the cannister 11, towline 15 is unwound from the windings 27 by rotation of the spool 29.

As best shown in FIGS. 5 and 6, the spool 29 is mounted on bearings 43 and 45 supported by the end cap 63 and end plate 36, respectively, to facilitate axial rotation of the spool 29. Centrifugal brakes 47 serve to oppose the rotation of spool 29 and thereby regulate the reeling pay-out speed of the deployed towline 15. The end cap 63 and end plate 36 are separated by four cylindrical spacer bushings 60 which are rigidly connected to the end cap 63 and end plate 36 adjacent their distal corners. One of the tubular spacer bushings 60A is provided with a radially extending aperture 65 therethrough, the diameter of which is sized greater than the diameter of the towline 15, such that the towline 15 may extend therethrough. The interior axial aperture 66 of the tubular spacer bushing 60A is formed to receive a towline cutter 67 and packing 69, as shown in FIG. 6. The central aperture 66 of the spacer bushing 60A is coaxial with a charge cavity 71 formed in the end cap 63. An additional pyrotechnic charge 38A comprising the identical charge 38 disposed within the charge cavity 33 is insertible from the exterior of the end cap 63 within the charge cavity 71. As will be recognized, upon detonation of the charge 38A, the cutter 67 is rapidly axially urged downwardly within the interior aperture 66 of the bushing 60A wherein the chisel point of the cutter 67 contacts the towline 15 extending radially through the interior of the bushing 60A, and severs or shears the towline 15. In addition, it will be recognized that the radial aperture 65 formed in the bushing 60A serves as a towline thimble guiding the towline 15 during pay out of the same.

The towline 15 is rigidly connected to the spool 29 by a terminal sleeve 133 (shown in FIG. 5) which may be wedged within an aperture 75 formed in the spool 29. The opposite end of the towline 15 is connected to the front surface of the decoy 13. The towline 15, after passage through the radial aperture 65 formed in the bushing 60A, extends to the decoy 16 via a relieved corner 77 formed in the end plate 36.

As shown in FIGS. 5 and 6, electrical signals to the decoy 13 are communicated to the cannister 11 via one or more pin connectors 81 which extend axially through the end cap 63. As best shown in FIGS. 8A and 8B, the pin connectors 81 extend to a stationary slip ring board 83 which is rigidly mounted in a coaxial orientation within the interior of the end cap 63. The surface of the stationary slip ring board 83, opposite to that surface from which the plural pin terminals 81 extends, is provided with multiple printed circuit wiring bands 85A, 85B, and 85C, which are electrically interfaced to a respective one of the plural pin connectors 81 via through-hole plating techniques. A complementary-shaped dynamic slip ring board 87 is affixed to the inboard axial end of the spool 29, and includes one or more spring contacts 89A, 89B, and 89C, which are radially aligned with the printed circuit wiring bands 85A, 85B, and 85C, respectively, formed on the stationary slip ring board 83. When assembled, the spring contacts 89A, 89B, and 89C of the dynamic slip ring board 87 contact the printed circuit wiring bands 85A, 85B, and 85C, respectively, of the stationary slip ring board 83, thereby allowing electrical signals received at the plural pins 81 to be communicated to the dynamic slip ring 87 during both static as well as rotational orientation of the spool 29. Conventional electrical connections are made from the dynamic slip ring board 87 to plural conductors 135 extending within the interior of the towline 15 and passing through the terminal sleeve 133 located within the interior of the spool 29 (as shown in FIGS. 5 and 6).

Referring more particularly to FIGS. 3, 4, and 5, it will be seen that the decoy 13 is formed having a generally cylindrical cross-sectional configuration terminating in a tail cone assembly 100. Referring more specifically to FIGS. 10 and 11, the tail cone assembly 100 is formed by a pair of wing segments 101 and 103 which are joined together via slots 105 and rigidly interconnected perpendicular to one another. The assembled wing segments 101 and 103 are subsequently mounted to a tubular tail cone 107 which is rigidly connected to the distal end of the main cylindrical body portion of the decoy 13. The resulting structure forms plural swept fins 110 extending radially outward from the tail cone 107 (as shown in FIG. 11). The four equally spaced swept fins 110 are formed having relatively long cord lengths and relatively short span lengths which are sized to fit within the square cross-sectional configuration of the cannister 11 (as shown in FIG. 4). Each of the swept aerodynamic fins 110 is provided with a sharpened leading edge 111. The sharpened edges 111 provides precise aerodynamic alignment which has been found to minimize roll torques arising from fin alignment imperfection. Additionally, the aerodynamic swept fins 110 comprise fixed non-deployable surfaces that provide decoy stability at both sub- and super-sonic speeds. In the preferred embodiment, the leading edge 110 of the aerodynamic swept fins 110 is formed having a 5-degree angle, as indicated by the construction angle EA in FIG. 11, while the front edge of the aerodynamic swept fins 110 is tapered through an angle of approximately 30 degrees indicated by the construction angle FA in FIG. 11.

Referring to FIGS. 3, 4, and 7, plural elongate guide members or inserts 121 are positioned within the interior of the cannister 11. The guide members 121 preferably extend within the interior of the cannister 11, a distance slightly less than the effective diameter of the cylindrical portion of the decoy 13, such that the decoy 13 is free to be ejected from the interior of the cannister 11 upon detonation of the charge 38, yet sufficiently far to form a guide or rail which maintains the general coaxial position of the decoy 13 within the interior of the cannister 11 during ejection. In addition, the interior of the cannister 11 adjacent its distal end is provided with a pair of roller guides 123 which are journaled by a pair of bearing blocks 125 rigidly affixed to the interior of the cannister 11. Each of the roller guides 123 is formed having a contoured external configuration sized to conform to the exterior diameter of the main cylindrical portion of the decoy 13. Due to the interface of the contoured exterior surface of the roller guides 123 with the exterior of the decoy 13, the roller guides 123 facilitate ejection of the decoy 13 perpendicular to the airstream of the aircraft where friction arising from high aerodynamic side load could otherwise reduce the ejection and/or stall the ejection of the decoy 13 in the cannister 11. As such, the roller guides 123 and guide inserts 121 serve to allow fail safe ejection or deployment of the decoy 13 from the cannister 11 even in applications wherein the ejection direction is perpendicular to the airstream of the aircraft.

Referring again to FIG. 5, it will be recognized that the distal portion of the end plate 36 comprises a cylinder which extends through only a relatively short axial length of the front portion of the decoy 13. Advantageously, the sabot 40 is formed having a slightly larger diameter than the diameter of the cylindrical portion of the decoy 13 and the effective diameter of the decoy guide rails 121. As such, upon detonation of the charge 38, the sabot 40 upon leaving the interior of the end plate 36 is trapped by interference of the guides 121, thereby eliminating the sabot 40 from possibly ejecting into the airstream where it could impact aircraft.

The provision of pyrotechnic charge cavities 33 and 71 within end cap 63 permits external loading of the charges 38 and 38A within charge cavity 33 without the need to disassemble the cannister 11 assembly. In addition, in view of the same size charge 38 and 38A being utilized for both decoy ejection and tow line cutting applications, inventory requirements of separate sized charges are eliminated by the present invention. Further, in view of the present invention incorporating a combined towline cutter and towline guide thimble disposed axially within the decoy ejection system, manufacturing and assembly costs are substantially reduced and operating efficiencies are substantially increased. Moreover, the use of bore 31 to direct the force from charge cavity 33 permits the space about bore 31 to be used for other purposes, such as storage of towline 15. Accordlingly, the present invention eliminates the need for a charge cavity between the towline spool and stored decoy and thereby decreases the required overall axial length of the assembly. As shown in FIG. 5, the inner core of the spool 29 has various stepped diameters, these not only accommodate the charge cavity 33 and bearing 43, but serve to reduce towline pay out time by reducing the amount of towline stored about the smallest spool core diameter which has little mechanical advantage on brakes 47 and 49 and therefore pays out the slowest.

In the preferred embodiment, the towline or tow cable 15 is formed from a tubular braid material, preferably KEVLAR, a trademark of E. I. duPont deNemoirs, Inc. This particular tubular braid material has been found to possess sufficient tensile strength necessary for pay out and towing applications of the decoy 13 as well as to facilitate multiple electrical conduits extending axially within the interior of the tubular braid to transmit electrical signals to the decoy 13 from the aircraft. However, the KEVLAR tubular braid material experiences a substantial reduction (i.e., approximately 30% reduction) in axial tensile strength when the Kevlar material is disposed in a non-coaxial orientation, such as at its bend at the spool termination and decoy termination of the towline 15. In this regard, in order to withstand the substantial initial ejection force exerted upon the towline during deployment of the decoy, which approximates a force of 500 G as well as the peak tensile force exerted upon the towline 15 when the decoy 13 comes to the end of its pay out length, the present invention contemplates the use of improved towline terminations as well as a method of fabricating the same, which significantly increases the tensile strength of the towline 15 adjacent its spool and decoy termination.

The specifics of this construction and methodology of the towline 15 is illustrated in FIGS. 12A through 12F. Initially, a small segment of tubular braid material 15A is inserted within the interior of a tubular fixture 131, as shown in FIG. 12A. The segment 15A typically comprises a length of approximately 8 inches, and the fixture 131 is utilized to maintain the segment 15A in a compressed radial dimension. Subsequently, each of the terminal ends of the tow cable 15, having a terminal sleeve 133 disposed thereon, is frayed to enlarge its open end and the end of the fixture 131 is inserted within the interior of the end of the towline 15, as depicted in FIG. 12B. The use of the fixture 131 facilitates the axial movement of the towline terminal segment 15A within the interior of the distal end of the towline 15 whereby the entire length the towline terminal segment 15A is coaxially positioned within the interior of the towline 15, as depicted in FIG. 12C. Subsequently, the sleeve fixture 131 may be removed from the interior of the distal end of the towline 15 while leaving the towline terminal segment 15A disposed within the interior of the towline end 15, as depicted in FIG. 12D.

The ends of the multiple wire conductors 135, extending throughout the length of the towline 15, may then be separated from the frayed ends of the towline 15 and towline terminal segment 15A, and the frayed ends of both the towline 15 and towline terminal segment 15A may be encapsulated in an expoxy resin 137, as depicted in FIG. 12. The connector sleeve 133 may then be axially slid from left to right, as viewed in FIG. 12D, to extend over the expoxied frayed ends of the towline 15 and towline terminal segment 15A and any excess frayed ends of the same may be trimmed adjacent the terminal sleeve 133, as indicated in FIG. 12E, resulting in a towline end termination, depicted in FIG. 12F wherein the termination includes a double strength tubular braid construction. As will be recognized, in view of the termination including a double wall tubular braid construction, significant additional strength is provided at the towline terminations, which double tubular construction forms in effect a Chinese finger grip arrangement which tightens upon itself and tensile force is applied to the termination to increase overall axial tensile strength of the termination.

As will be apparent to those of ordinary skill in the art, the precise arrangement of stationary bearing and rotating surfaces forming the various mechanisms disclosed may herein be modified to a variety of different arrangements which still embody the principal structural and functional features of the invention. Accordingly, it is to be understood that the invention, in its broader aspects, is not intended to be limited to the particular arrangement of parts set forth in connection with the presently preferred embodiment, but may be modified to accommodate the requirements of a particular application without departing from the spirit or scope of the invention.

What is claimed is:

1. A decoy deployment system comprising:
   a housing sized to be stored upon an aircraft;
   a decoy disposed within said housing;
   a rotatable spool disposed within said housing;
   a towline connected to said decoy and dispensably stored about said rotatable spool;
   a towline cutter disposed within said housing between said decoy and said spool; and
   a pair of pyrotechnic charges disposed within housing adapted to be removed therefrom from the exterior of said housing, one of said pair of charges upon detonation causing a force to be applied to said decoy to eject said decoy from said housing, and the other of said pair of charges upon detonation causing a force to be applied to said towline cutter to cut said towline.

2. The decoy deployment system of claim 1 wherein said towline cutter includes thimble means for guiding said towline between said rotatable spool and said decoy.

3. The decoy deployment system of claim 2 wherein said pair of pyrotechnic charges are similarly sized so as to be interchangeable within said housing.

4. The decoy deployment system of claim 3 further comprising braking means disposed within said housing in abutting relation to said rotating spool said braking means being adapted to oppose rotation of said spool to limit deployment speed of said towline.

5. The decoy deployment system of claim 1 further comprising guide members formed in said housing for facilitating frictional forces applied to said decoy by aerodynamic side loads encountered in ejection of said decoy from said housing in directions generally perpendicular to the airstream of the aircraft.

6. The decoy deployment system of claim 5 wherein said guide members comprises plural rollers disposed within said housing, said rollers having an exterior surface formed in a contoured complimentary configuration to the exterior surface of said decoy.

7. The decoy deployment system of claim 6 wherein said guide members additionally comprise plural elongate guides extending axially within the interior of said housing.

8. The decoy deployment system of claim 7 further comprising a sabot positioned within the interior of said housing between said spool and said decoy.

9. The decoy system of claim 8 wherein said sabot is sized larger than said decoy to be retained within said housing after ejection of said decoy from said housing.

10. The decoy deployment system of claim 9 wherein said decoy includes a tail fin assembly having multiple swept fins symmetrically spaced about the periphery of said decoy, said fins having greater cord length than span length to facilitate stability of said decoy in flight at both sub-sonic and super-sonic speed.

11. The decoy deployment system of claim 10 wherein each of said multiple swept fins includes a sharpened leading edge providing aerodynamic alignment for said decoy.

12. The decoy deployment system of claim 11 wherein said pair of charges are each positioned in cavities accessible from one end of said housing such that each of said pair of charges may be placed in or removed from said cavities without the need to dissemble said housing.

13. A decoy deployment system comprising:
   a housing;
   a decoy disposed within said housing adapted to be ejected through one end of said housing;
   a rotatable spool disposed within said housing adjacent the other end of said housing;
   a towline connected to said decoy and dispensably stored in windings about said spool; and
   a sabot positioned between said spool and said decoy for transmitting a pyrotechnic charge force to said decoy for ejecting said decoy from said housing, said sabot sized to have a diameter larger than the diameter of said decoy so as to be retained within said housing during ejection of said decoy from said housing 14. The decoy deployment system of claim 13 further comprising guides formed on the interior of said housing, said guides defining an effective diameter larger than the diameter of said decoy but smaller than the diameter of said sabot.

15. The decoy deployment system of claim 14 further comprising plural guide rollers positioned within said housing adjacent said one end of said housing, said rollers having a contoured outer surface formed to contact the exterior of said decoy and counteract friction side loads applied to said decoy during ejection of said decoy from said housing.

16. The decoy deployment system of claim 15 further comprising a towline cutter disposed within said housing between said spool and said decoy.

17. The decoy deployment system of claim 16 wherein said towline cutter further includes means for guiding said towline during pay out from said spool.

18. The decoy deployment system of claim 17 further comprising a slip ring asssembly disposed adjacent one end of said spool adapted to provide an electrical interface between said housing and said decoy.

19. The decoy deployment system of claim 18 wherein said slip ring assembly comprises:
 a stationary slip ring board mounted to said housing adjacent the other end of said housing, said stationary slip ring board having plural pin contacts extending outward through said housing and plural contact rings formed on one side thereof; and
 a dynamic slip ring board mounted to one end of said spool, said dynamic slip ring board having plural spring contacts formed to contact a respective one of said plural contact rings formed on said stationary slip ring board.

20. The decoy deployment system of claim 17 wherein said towline is formed of a tubular braided material.

21. The decoy deployment system of claim 20 wherein said towline includes termination ends having double thickness portions of said tubular braided material.

22. A decoy deployment system comprising:
 a housing sized to be stored upon an aircraft;
 a decoy positioned within said housing and adapted to be ejected through one end of said housing;
 a rotatable spool positioned within said housing;
 a towline connected to said decoy and dispensably stored upon said spool; and
 plural roller bearings formed having a contoured exterior surface disposed within said housing adjacent said one end of said housing for contacting said decoy during ejection of said decoy from said housing to accommodate frictional forces exerted upon said decoy arising from aerodynamic side load encountered during ejection of said decoy in directions generally perpendicular to the airstream of the aircraft.

23. The decoy deployment system of claim 22 wherein said contoured exterior surface of said plural roller bearings is formed in a complimentary configuration to the exterior surface of said decoy.

24. The decoy deployment system of claim 23 further comprising plural guides within said housing for guiding said decoy out of said housing during ejections.

* * * * *